(12) United States Patent
Moeller

(10) Patent No.: US 10,764,708 B2
(45) Date of Patent: Sep. 1, 2020

(54) SPATIAL AUDIO TO ENABLE SAFE HEADPHONE USE DURING EXERCISE AND COMMUTING

(71) Applicant: Google LLC, Mountain View, CA (US)

(72) Inventor: Jonathan Moeller, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/454,900

(22) Filed: Jun. 27, 2019

(65) Prior Publication Data
US 2019/0320282 A1 Oct. 17, 2019

Related U.S. Application Data

(63) Continuation of application No. 15/908,206, filed on Feb. 28, 2018, now Pat. No. 10,375,506.

(51) Int. Cl.
| *H04R 5/02* | (2006.01) |
| *H04S 7/00* | (2006.01) |
| *H04R 5/033* | (2006.01) |
| *G06F 3/01* | (2006.01) |
| *G06F 3/16* | (2006.01) |
| *H04R 1/10* | (2006.01) |

(52) U.S. Cl.
CPC ............... *H04S 7/304* (2013.01); *G06F 3/012* (2013.01); *G06F 3/167* (2013.01); *H04R 5/033* (2013.01); *H04S 7/301* (2013.01); *G06F 3/011* (2013.01); *H04R 1/1041* (2013.01); *H04S 2400/11* (2013.01); *H04S 2400/13* (2013.01); *H04S 2420/01* (2013.01)

(58) Field of Classification Search
CPC .......... H04S 7/304; G06F 3/012; G06F 3/167; H04R 5/033
See application file for complete search history.

(56) References Cited

U.S. PATENT DOCUMENTS

| 5,687,239 A | 11/1997 | Inanaga et al. |
| 5,696,831 A | 12/1997 | Inanaga et al. |
| 6,011,526 A | 1/2000 | Toyoshima et al. |
(Continued)

FOREIGN PATENT DOCUMENTS

WO 2018057174 A1 3/2018

OTHER PUBLICATIONS

Invitation to Pay Additional Fees, Communication Relating to the Results of the Partial International Search, and Provisional Opinion for International Patent Application No. PCT/US2019/018729 dated May 29, 2019. 17 pages.

(Continued)

*Primary Examiner* — Simon King
(74) *Attorney, Agent, or Firm* — Lerner, David, Littenberg, Krumholz & Mentlik, LLP

(57) ABSTRACT

Sound is produced through headphones in a manner that improves user experience and increases safety. In some circumstances, such as when the user is moving during exercise, commuting, etc., an audio safety spatialization mode of the headphones is automatically activated. In this mode, sound is spatialized such that when the user turns his head, the sound appears to be generated from a same position in space as before the user turned his head. If the user's head remains in the turned position, the spatialized sound will return to an initialized position with respect to the user's head.

14 Claims, 9 Drawing Sheets

(56) References Cited

U.S. PATENT DOCUMENTS

| | | | |
|---|---|---|---|
| 2011/0293129 A1* | 12/2011 | Dillen | H04S 7/304 |
| | | | 381/370 |
| 2014/0153751 A1 | 6/2014 | Wells | |
| 2015/0296289 A1 | 10/2015 | Lakkundi et al. | |
| 2017/0195795 A1 | 7/2017 | Mei et al. | |
| 2018/0091922 A1* | 3/2018 | Satongar | G06F 3/012 |
| 2018/0091923 A1 | 3/2018 | Satongar et al. | |

OTHER PUBLICATIONS

International Search Report and Written Opinion for International Patent Application No. PCT/US2019/018729 dated Jul. 30, 2019. 23 pages.

\* cited by examiner

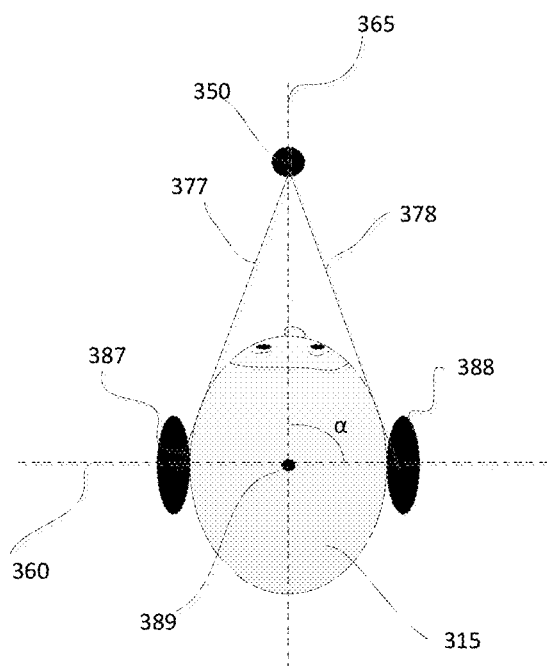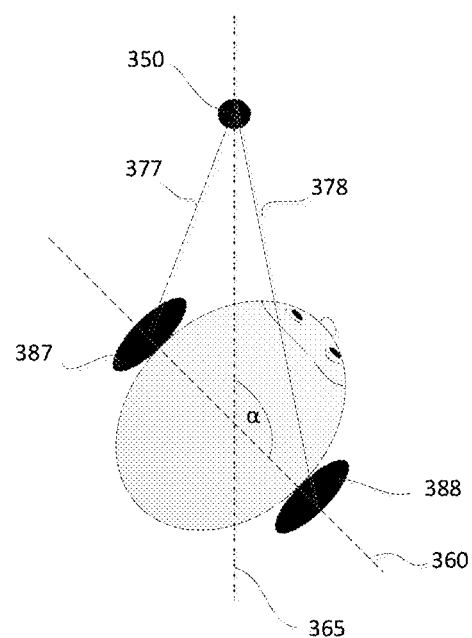
Fig. 3A
Fig. 3B

SPATIAL AUDIO TO ENABLE SAFE HEADPHONE USE DURING EXERCISE AND COMMUTING

CROSS-REFERENCE TO RELATED APPLICATIONS

The present application is a continuation of U.S. patent application Ser. No. 15/908,206, filed Feb. 28, 2018, the disclosure of which is incorporated herein by reference.

BACKGROUND

Headphone use when cycling, running, or other forms of commuting or exercise can be dangerous. For example, use of said headphones may interfere with the user's ability to hear the environment around them. As such, users may be unaware of objects surrounding or approaching them, which can result in collisions or other unexpected events. Audio pass-through headphones record noise from the environment through a microphone and then replay it digitally through the headphones with very little delay, allowing users to "tune in" and "tune out" from the environment around them. However, such systems do not offer much flexibility, and require the user to remember to "tune in."

BRIEF SUMMARY

The present disclosure provides for an audio spatialization technique which correlates the spatialization with a recognized activity. For example, it may be detected when a user is performing an activity such as exercising, occupying a high traffic area, etc. Upon detection of such activity, the user's headphones may transition to an audio safety spatialization mode, in which sound is produced through the headphones based on a position of the headphones relative to a position of the sound source. For example, whereas a user may hear traffic behind him equally in both ears when facing directly forward, when the user turns his head to the left he may hear the traffic more distinctly in his left ear and more subtly in his right ear.

One aspect of the disclosure provides a method for producing sound through headphones having a right ear portion and a left ear portion. The method may include establishing a virtual audio source at a first position, the first position being a first point in space relative to a neutral position of the headphones when worn by a user. Sound is generated through the right ear portion and the left ear portion of the headphones, such that the sound is produced with an effect of emanating from the virtual source. Angular movement of the headphones with respect to the first position is detected, such that an angle of the headphones with respect to the first position may be determined. A sound level in at least one of the right ear portion or the left ear portion is reduced based on the determined angle. When one or more conditions are met, the virtual audio source is moved to a second position, the second position being a second point in space different from the first point in space but a same position relative to the neutral position of the headphones.

Another aspect of the disclosure provides a system. The system may include headphones comprising a left-ear audio output and a right-ear audio output, a memory storing instructions for generating audio through the left-ear audio output and the right-ear audio output, and one or more processors in communication with the memory. The one or more processors are configured to establish a virtual audio source at a first position, the first position being a first point in space relative to a neutral position of the headphones when worn by a user, and generate sound through the right-ear audio output and the left-ear audio output, such that the sound is produced with an effect of emanating from the virtual source. The one or more processors are further configured to detect angular movement of the headphones with respect to the first position, determine an angle of the headphones with respect to the first position as a result of the detected angular movement, and reduce a sound level in at least one of the right-ear audio output or the left-ear audio output based on the determined angle. Further, the one or more processors may move the virtual audio source to a second position when one or more conditions are met, the second position being a second point in space different from the first point in space but a same position relative to the neutral position of the headphones.

Yet another aspect of the disclosure provides a non-transitory computer-readable medium storing instructions executable by one or more processors in a pair of headphones including a left ear portion and a right ear portion for performing a method of audio safety spatialization. Such method may include establishing a virtual audio source at a first position, the first position being a first point in space relative to a neutral position of the headphones when worn by a user, generating sound through the right ear portion and the left ear portion of the headphones, such that the sound is produced with an effect of emanating from the virtual source, detecting angular movement of the headphones with respect to the first position, determining an angle of the headphones with respect to the first position as a result of the detected angular movement, reducing a sound level in at least one of the right ear portion or the left ear portion based on the determined angle, and moving the virtual audio source to a second position when one or more conditions are met, the second position being a second point in space different from the first point in space but a same position relative to the neutral position of the headphones.

Another aspect of the disclosure provides a method, including detecting a direction of movement of headphones having a right ear portion and a left ear portion, and establishing a virtual audio source for the headphones based on the direction of movement. Sound is generated through the right ear portion and the left ear portion of the headphones, such that the sound is produced with an effect of emanating from the virtual audio source. The method further includes detecting angular movement of the headphones with respect to the virtual audio source, and adjusting the sound generated through at least one of the right ear portion or the left ear portion based on the angular movement with respect to the virtual audio source. In some examples, detecting the direction of movement of the headphones includes detecting forward linear movement when the headphones are in a neutral orientation, and establishing the virtual audio source includes establishing the virtual audio source at a position in front of the headphones. The method may further include detecting a change in the direction of movement of the headphones, and moving the virtual audio source based on the detected change in the direction of movement.

Another aspect of the disclosure provides a system, including headphones comprising a left-ear audio output and a right-ear audio output, one or more sensors, a memory storing instructions for generating audio through the left-ear audio output and the right-ear audio output, and one or more processors in communication with the memory and the one or more sensors. The one or more processors are configured to receive input from the one or more sensors, detect a direction of movement of the headphones based on the received input, establish a virtual audio source for the headphones based on the direction of movement, generate sound through the right ear portion and the left ear portion of the headphones, such that the sound is produced with an effect of emanating from the virtual audio source, detect angular movement of the headphones with respect to the virtual audio source and adjust the sound generated through at least one of the right ear portion or the left ear portion based on the angular movement with respect to the virtual audio source. In some examples, the one or more sensors include at least one of an accelerometer, gyroscope, or magnetometer.

BRIEF DESCRIPTION OF THE DRAWINGS

FIGS. 3A-3D illustrate example audio spatialization techniques according to aspects of the disclosure.

DETAILED DESCRIPTION

Overview

Figure 1:
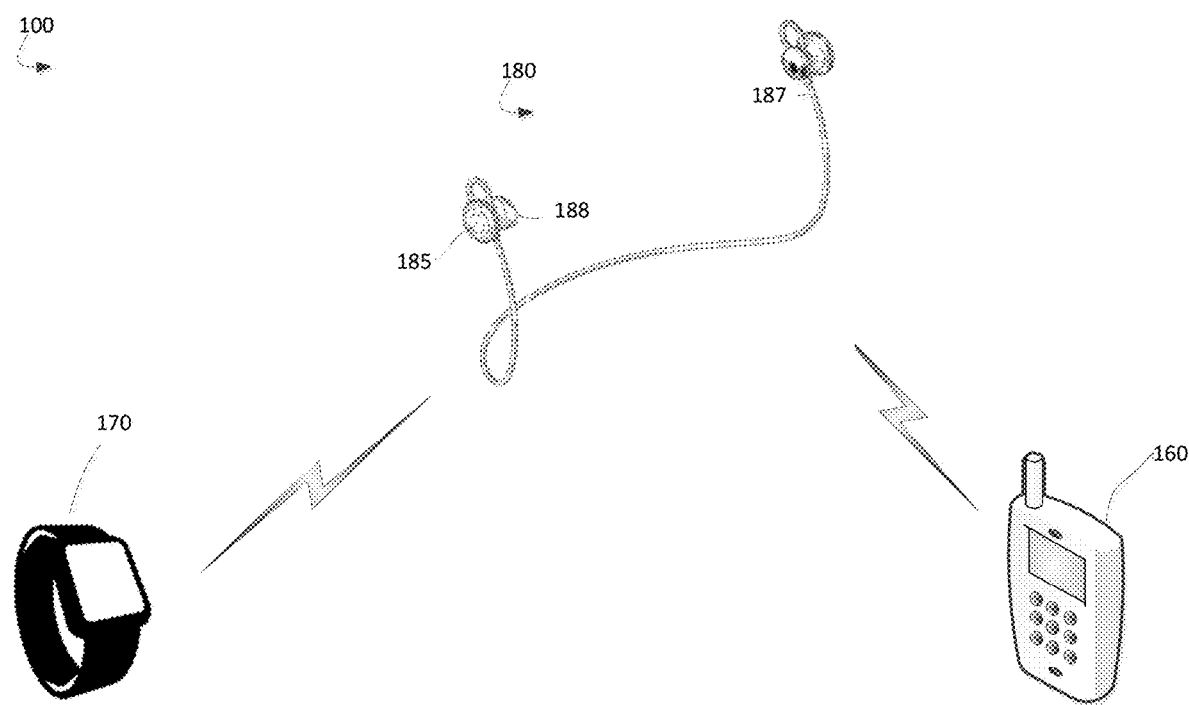
FIG. 1 is a pictorial diagram of an example system according to aspects of the disclosure.

The present technology is directed to producing sound through earbuds or headphones in a manner that improves user experience and increases safety. In particular, in some circumstances, sound is spatialized such that when the user turns his head, the sound appears to be generated from a same position in space as before the user turned his head. If the user's head remains in the turned position, the spatialized sound will return to an initialized position with respect to the user's head. For example, if the sound appeared to be initially generated from a position in front of the user, when the user turned to the left the sound would remain in the same virtual location, appearing to be coming from the user's right side. If the user remains turned to the left, the virtual location of the sound would slowly return to a position in front of the user, such that after a period of time the sound would again appear to be generated from a position in front of the user. The circumstances in which sound is spatialized may be, for example, when the user is moving, such as during exercise, commuting, etc.

The technology includes three subsystems, acting in concert: 1) an activity detection unit; 2) an audio safety spatialization algorithm; and 3) a head-worn inertial measurement unit (IMU). The subsystems may be implemented as an integral part of the headphones and/or in combination with a communicatively coupled smart device, such as a tablet, watch, phone, etc.

The activity detection unit determines if the user is participating in an activity that qualifies for activation of a safety spatialization mode. Examples of such activities may include bicycling, running, skateboarding, or any other activity where a user is moving in a given direction within a threshold range of speed. For example, the threshold range of speed may encompass speeds associated with walking, skating, cycling, but may be slower than speeds associated with traveling in a motor vehicle. In some examples, activities which activate the audio spatialization mode may be ones in which a user is moving on or near a path traveled by motor vehicles, other people, animals, etc. The activity can be detected by the headphones themselves, by a paired device (e.g., phone, watch, etc.), or by any combination thereof. When such activity is detected, the audio safety spatialization algorithm is activated. In some examples, the audio safety spatialization feature may be activated by user input, such as by a gesture of press of a button. For example, if the user is sitting at a desk working, but wants to be able to turn around to better hear a conversation behind her, the user may activate the audio spatialization feature.

The audio safety spatialization algorithm reproduces the audio as a "virtual source" floating in front of the user. When the user turns his head, the virtual source remains in its position relative to the user, which greatly increases the user's spatial awareness of the environment. As an example, if the user is bicycling or running down the street, the virtual source will remain "in front" of him (i.e., the direction he is moving). If the user turns his head to the left to look over his left shoulder (e.g., to check for an automobile), the volume of the source in his left ear will decrease significantly, which enables heightened awareness toward sounds emanating from the direction he is facing. With a traditional pair of headphones, in contrast, if a listener turns his head, the volume in both ears remains constant, and thus the user is equally unable to hear ambient sounds, no matter which direction he is facing. When the audio safety spatialization feature is not activated, the headphones may operate as a traditional pair of headphones.

The "virtual source" may remain in a position relative to the user's direction of travel. For example, where the user that is bicycling or jogging in the example above makes a turn, as opposed to merely turning his head, the virtual source may move to a new position in front of the user in the new direction of travel. Movement of the virtual source may be based on time, detected direction of travel, or some combination of these or other factors.

When the audio safety spatialization feature is activated, an angle $\theta$ corresponding to the current direction the user is facing is initialized to 0. The angle $\theta$ may be determined by the IMU, for example, using data from a gyroscope, magnetometer, accelerometer, etc. The headphones operate with the audio spatialization feature based on this initial value of $\theta$. Data may be continually fetched from the IMU, such as every 20 ms, 200 ms, etc. Each time data is fetched from the IMU, the angle $\theta$ is updated according to the direction the user is currently facing. In some examples, a "return to zero" function may be applied to the angle $\theta$, with time constant $\tau$, such that the angle of the source relative to the user always returns to zero. The return to zero repositions the virtual source of the audio to a position in front the user over time, such as when the user makes a turn other than just a quick turn of the head in one direction or other. The audio spatialization feature is updated, and the headphones operate based on, the current value of $\theta$.

Example Systems

Figure 2:
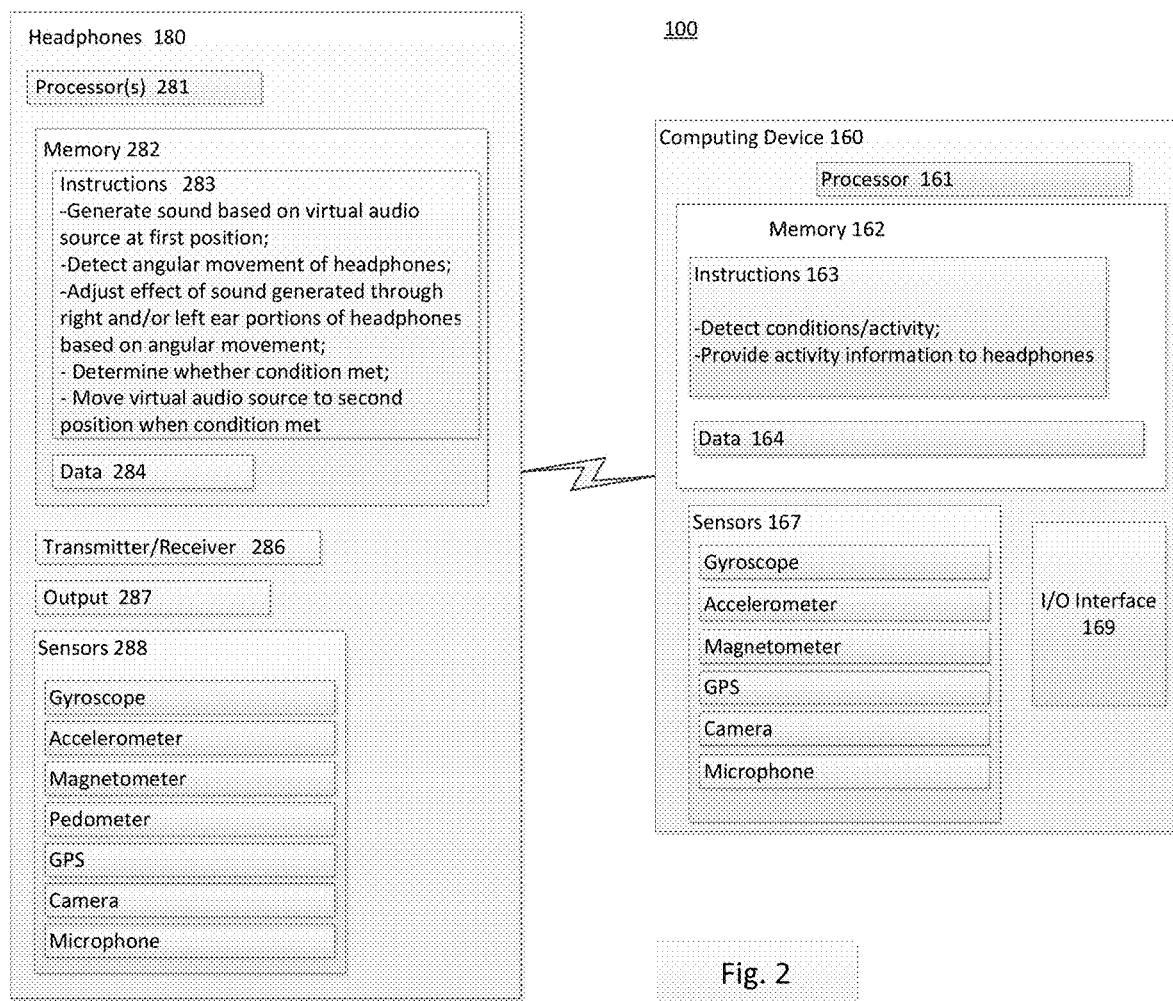
FIG. 2 is a block diagram of an example system according to aspects of the disclosure.

FIGS. 1 and 2 illustrate an example system 100 for audio safety spatialization. The system 100 can include a pair of headphones 180 in communication with one or more computing devices 160, 170. The computing devices 160, 170 may be, for example, a mobile phone, a smart watch, a gaming system, a tablet, or any other mobile computing device. In some examples, the example system 100 may be entirely contained within the headphones 180, such that the headphones 180 perform all audio safety spatialization operations without communication from other devices. In other examples, as illustrated in FIGS. 1-2, the computing devices 160, 170 may perform some operations and provide information to the headphones 180 based on such operations. While FIGS. 1-2 illustrate the headphones 180 as communicating with and utilizing information from one or two computing devices, it should be understood that the headphones 180 may receive information from any number of computing devices.

Headphones 180 may include any type of audio source having a left speaker portion 187 and a right speaker portion 188, such as shown in FIG. 2. For example, headphones may be a pair of earbuds where a portion of the device is inserted into a concha of a user's ear, a pair of over-ear or around-ear speakers held in place over or around the user's ears, such as by a headband portion, an in-ear monitor inserted into a canal of the user's ear, or any other types of headphones providing sound to the user's ears. In some examples, the headphones 180 may include an input portion input portion 185 adjacent an outer surface, attached to a cable, or elsewhere on the headphones. For example, the input portion 185 may be pressed or otherwise activated to change an operating mode of the headphone 180 or to perform other functions. In some examples, the input portion 185 may be activated to switch the headphones 180 between an audio safety spatialization mode and a standard operating mode.

The headphones 180 may communicated with the computing devices 160, 170 via a wired or wireless connection. For example, the devices may be wirelessly coupled via a short range pairing connection, such as Bluetooth. Other types of wireless connections are also possible. The headphones 180 and computing devices 160, 170 can utilize standard communications protocols, such as Ethernet, WiFi, HTTP, protocols described in IEEE 802.11, cellular technology (such as GSM, CDMA, UMTS, EV-DO, WiMAX, LTE, etc.) protocols that are proprietary to one or more companies, and various combinations of the foregoing. The subject matter described herein is not limited to any particular manner of transmission of information.

As illustrated in FIG. 2, the headphones 180 may include one or more processors 281, memory 282 and other components typically present in headphones or other computing devices.

Memory 282 of headphones 180 can store information accessible by the one or more processors 281, including instructions 283 that can be executed by the one or more processors 281. Memory 282 can also include data 284 that can be retrieved, manipulated or stored by the processor 281. The memory 282 can be of any non-transitory type capable of storing information accessible by the processor, such as a hard-drive, memory card, ROM, RAM, etc.

The instructions 283 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 284 may be retrieved, stored or modified by the one or more processors 281 in accordance with the instructions 283. The subject matter described herein is not limited by any particular data structure. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 281 can be any conventional processors, such as a commercially available CPU. Alternatively, the processors can be dedicated components such as an application specific integrated circuit ("ASIC") or other hardware-based processor.

The headphones 180 may further include a transmitter/receiver 284, output 287, and one or more sensors 288. The transmitter/receiver 284 may be any conventional type which enables communication with other devices, such as the computing device 160. The output 287 may include audio speakers, including a first speaker designated for a user's right ear and a second speaker designated for the user's left ear. In some examples, other types of output may also be provided, such as tactile feedback, image output on a display, etc.

The one or more sensors 288 may provide for determination of an activity or condition associated with the user. For example, the sensors 288 may include a gyroscope which detects an inertial position of the headphones 180, an accelerometer which detects linear movement of the headphones, a magnetometer, a pedometer, a global positioning system (GPS), camera, microphone, or any of a number of other types of sensors. The one or more sensors 288 may operate independently or in concert. Based on input from the sensors 288, the processor 281 may determine that the user is, for example, jogging, cycling, skateboarding, walking on a crowded sidewalk, occupying another busy space, riding on public transit, or performing any of a number of other activities for which the user might want or need increased awareness of his surroundings. The one or more processors 281 may receive information from the computing device 160, for example through transmitter/receiver 286, in addition or in the alternative to receiving information from the sensors 288.

The instructions 283 may provide for transitioning into an audio safety spatialization mode based on the input from the sensor 288 and/or 167. For example, in a regular or default mode of operation, the headphones 180 may generate sound equally and consistently through both right and left ear portions of output 287. However, upon detection of a condition or activity, such as exercising, commuting, or occupying a busy space, the instructions may provide for transition to the audio safety spatialization mode. In this mode, sound is generated through the right and left ear portions of the output 287 with the effect of emanating from a virtual audio source at a first position. The first position may be a position relative to the headphones or the user wearing the headphones. For example, the first position may be in front of the user, as described below in the example of FIG. 3A. As angular movement of the headphone is detected, an effect of the sound is adjusted based on the angular movement. For example, when the user turns his head to the left, the virtual audio source in front of the user will be output more subtly or quietly in the left ear speaker portion and more distinctly or loudly in the right ear speaker portion. In this regard, based on the adjusted output in the respective speaker portions, the user perceives the virtual audio source as remaining in the same fixed position in space, despite the user's adjusted head position. This is described further in connection with FIG. 3B below.

According to some examples, when one or more conditions are met, the virtual audio source may be moved to a second position. The second position may be the same as the first position relative to the user or headphones (e.g., in front of the user), but a different position in space, as described further in connection with FIG. 3C. The conditions which may result in moving the virtual audio source may include, for example, the headphones or user's head remaining in the adjusted angular position for a predefined period of time. Such period of time may be, for example, a few hundred milliseconds, several seconds, or any other length of time suggesting that the user's head is likely to remain in the updated position.

Computing device 160 may include components similar to those of the headphones 180, including one or more processors 161 in communication with a memory 162 including instructions 163 and data 164. The computing device 160 may be a mobile computing device intended for use by a user and capable of wirelessly exchanging data with a server over a network such as the Internet. By way of example only, computing device 160 may be a mobile phone or a device such as a wireless-enabled PDA, a tablet PC, a netbook, a smart watch, a head-mounted computing system, or any other device that is capable of sharing information with the headphones 180. The user may input information using a small keyboard, a keypad, microphone, using visual signals with a camera, or a touch screen, etc.

The computing devices 160, 170 may have all of the components normally used in connection with a mobile computing device such as a processor, memory (e.g., RAM and internal hard drives) storing data and instructions, a display such as display 165, and user input device 166 (e.g., input buttons, touch-screen, microphone, etc.). The client computing device may also include one or more sensors 167 for detecting conditions surrounding the mobile device. For example, the sensors 167 may include an image capture device, such as a camera for recording video streams and/or capturing images, speakers, a network interface device, and all of the components used for connecting these elements to one another. The sensors 167 may also include a location determination system, such as a GPS. Other examples of location determination systems may determine location based on wireless access signal strength, images of geographic objects such as landmarks, semantic indicators such as light or noise level, etc.

The sensors 167 may further include, by way of example and not limitation, a gyroscope, accelerometer, magnetometer, GPS, camera, microphone, light sensor, motion sensor, etc. Such sensors may be used to detect a variety of different conditions, such as movement, weather conditions, sounds, nearby objects, electromagnetic fields, etc. The sensors 167 may in some examples recognize detailed information relating to the conditions. For example, the gyroscope and accelerometer may not only detect whether the device 160 is moving or not, but may determine whether the movement is linear or rotational, a direction of the movement, a speed of the movement, etc. Information from different types of the sensors 167 may also be used to determine conditions or activities. For example, a low reading from a light sensor in combination with a high pressure reading from a barometer may indicate rain. As another example, a particular speed and level of vibration may indicate that the device 160 is traveling on a bicycle, while received sounds or smells indicate that the device 160 is passing a restaurant.

Memory 162 can store information accessible by the one or more processors 161, including instructions 163 that can be executed by the one or more processors 161. Memory 162 can also include data 164 that can be retrieved, manipulated or stored by the processor 161. The memory 162 can be of any non-transitory type capable of storing information accessible by the processor, such as a hard-drive, memory card, ROM, RAM, DVD, CD-ROM, write-capable, and read-only memories.

The instructions 163 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 164 may be retrieved, stored or modified by the one or more processors 161 in accordance with the instructions 163. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 161 can be any conventional processors, such as a commercially available CPU. Alternatively, the processors can be dedicated components such as an application specific integrated circuit ("ASIC") or other hardware-based processor. Although not necessary, computing device 160 may include specialized hardware components to perform specific computing processes, such as image recognition, object recognition, voice recognition, etc.

The instructions 163 are executable by the processor 162, for example, to perform a method including receiving a policy for reporting information, detecting surrounding conditions or activities, determining whether the detected condition or activity triggers reporting of information in accordance with the policy, and report information when it is triggered. The reporting may including at least one of sampling data or uploading information, or both. According to some examples, a first condition or activity may trigger the sampling of data, while a second different condition or activity triggers uploading information.

The device 160 further includes an input/output (I/O) interface 169. I/O interface 169 may provide for communication, using analog or digital modulation, between the computing device 160 and other devices or networks. The I/O interface 169 may facilitate circuit-switched and/or packet-switched communication. For instance, I/O interface 169 may include a chipset and antenna arranged for wireless communication with a radio access network or an access point. I/O interface 169 may include a wireline interface, such as an Ethernet, Universal Serial Bus (USB), or High-Definition Multimedia Interface (HDMI) port. I/O interface 169 may also include a wireless interface, such as a Wi-Fi, or wide-area wireless interface (e.g., WiMAX or 3GPP Long-Term Evolution (LTE)). Other forms of physical layer interfaces and other types of communication protocols may also be used. Furthermore, I/O interface 169 may comprise multiple physical communication interfaces (e.g., a Wifi interface, a short range wireless interface, and a wide-area wireless interface), and may enable multiple simultaneous connections of different types.

The I/O interface 169 may be used to establish connectivity with one or more other computing devices, such as the headphones 180. The I/O interface 169 may be used to establish connections with access points, to detect beacons or radio frequency identification (RFID) tags, to determine connectivity information, etc. Such information may further be used to determine conditions or activities associated with the device 160, the headphones 180, or the user. For example, a number of other computing devices moving in close proximity with the device 160 may suggest that the device 160 is on a public train or a busy sidewalk. More precise determinations can be made when combined with other sensor information, such as noise level, vibrations, speed, etc.

While several examples of how various types of detected information can be used separately or in combination to determine conditions surrounding the device 160 or activities, it should be understood that any number of various activities or conditions can be determined using various inputs. Moreover, while examples of information or activities detected by one device, such as the computing device 160, were described, it should be understood that such information or activities could similarly be detected by other devices, such as the headphones 180.

Figure 3C:
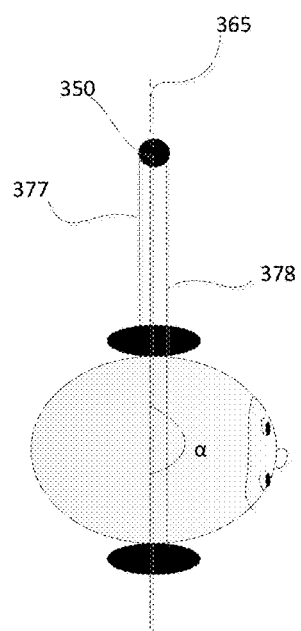

FIGS. 3A-3C illustrate an example of audio spatialization. In FIG. 3A, user 315 is wearing headphones including left ear portion 387 and right ear portion 388. Audio is reproduced through the left ear portion 387 and the right ear portion 388 as a virtual source 350 in front of the user. For example, the user 315 would perceive audio generated through the headphones, such as music, audio books, etc., as being generated from the virtual source 350 in front of the user. As explained in further detail below, when the user 315 is facing forward in a neutral position, sound is played equally through the left and right ear portions 387, 388. However, when the user 315 turns his head, the virtual audio source 350 remains in the same position. As such, sound is played louder in the portion of the headphones closer to the virtual audio source 350 than in the portion of the headphones further from the virtual audio source 350.

As shown in FIG. 3A, a first plane 360 that includes both the left ear portion 387 and the right ear portion 388, forms a first angle α with respect to a second plane 365 that includes the virtual audio source 350 and a center point 389 between the left ear portion 387 and the right ear portion 388. In this example, the angle α is approximately 90 degrees, and a first distance 377 between the virtual audio source 350 and the left ear portion 387 is approximately equal to a second distance 378 between the virtual audio source 350 and the right ear portion 388. Accordingly, sound may be produced at a same level through the left ear portion 387 and the right ear portion 388. For example, both portions of headphones may produce sound at the same volume, frequency, saturation, bass, etc.

While in the present example the virtual audio source 350 is in front of the user, in other examples the virtual audio source may have a different position relative to the user. For example, the virtual audio source 350 may be behind the user, to a side of the user, or in a position corresponding to a source of environmental sounds. Moreover, it should be understood that the angle of the virtual audio source 350 with respect to the user or the headphones may be measured in any of a number of different ways.

In FIG. 3B, a position of the headphones has changed relative to the virtual audio source 350. In particular, the user has turned his head approximately 45 degrees to the right. As such, the first plane 360 including the headphones has changed, and thus the angle α between the first plane 360 and the second plane 365 has also changed. Further, the first distance 377 is now shorter than the second distance 378. In this example, sound generated through the left ear portion 387 may be at a higher level with respect to sound generated through the right ear portion 388. For example, to give the effect of the virtual audio source 350 remaining in a same point in space, sound corresponding to the virtual audio source 350 may be played more loudly through the closer left ear portion 387 than through the farther right ear portion 388. Any of a number of audio spatialization techniques may be implemented, such as volume-based panning, head related transfer function (HRTF) spatialization, or the like.

FIG. 3C provides another example of a change in position. In this example, the user turns his head approximately 90 degrees with respect to the initial position of FIG. 3A. As such, the angle α in this example is even greater, being approximately 180 degrees. Moreover, the first distance 377 is even shorter relative to FIG. 3B, and the second distance 378 is even longer. Accordingly, sound generated through the left ear portion 387 may be at a higher level relative to the level in FIG. 3B, and the sound generated through the right ear portion 388 maybe at a lower level relative to that of FIG. 3B. Accordingly, the user has heightened awareness of his surroundings in the direction he is facing.

In each of the examples above, the virtual audio source 350 remains in generally the same point in space, though the user's angular position changes. In examples where the user is traveling, the virtual audio source 350 may also travel at a same rate of speed, such that it remains at a same linear position relative to the user. In such examples, though the linear position may be continually updated based on the user's movement, changes in angular position as described above in connection with FIGS. 3A-3C may be detected and used to effect a change in the sound generated through the headphones.

Where the change in angular position is a result of a quick turn of the user's head, the user may shortly thereafter return to the initial position. As the user's head turns, the adjustment in sound emitted through the left ear portion 387 and the right ear portion 388 may be instantaneous. As the user returns to the initial position of FIG. 3A, the generated sound would return to the same levels as described in connection with FIG. 3A. In some examples, however, the change in angular position of the headphones or user's head may remain for a prolonged period of time. By way of example only, if the user is jogging and makes a right turn, as opposed to quickly turning his head to check surroundings over his right shoulder, the virtual audio source 350 may be moved to a different position in space, such that it realigns with the initial position relative to the user.

Figure 3D:
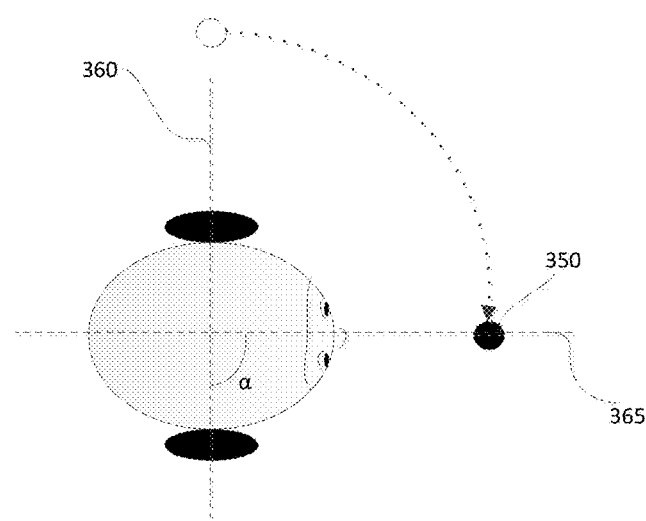

FIG. 3D illustrates an example of moving the virtual audio source 350, such as when the user's or headphones' angular position changes for at least a predetermined period of time, when the user changes a direction of travel, or when other conditions are met. The predetermined period of time may be, for example, one second or several seconds or more. In other examples, sensors in the headphones and/or coupled computing devices may detect a direction of the user's movement, and compare such direction to an orientation of the headphones. In such examples, the virtual audio source 350 may be moved in response to detecting a change in the user's direction of travel. It should be understood that other conditions for moving the virtual audio source 350 are also possible.

As shown in FIG. 3D, the virtual audio source 350 is moved to a position in front of the user, such position corresponding to the initial position relative to the user illustrated in FIG. 3A. Accordingly, the first plane 360 through the left and right ear portions 387, 388 is again at an angle of approximately 90 degrees with respect to the second plane 365 through the virtual audio source 350 and a center point of the headphones or the user's head. In this regard, the sound generated from the left and right ear portions 387, 388 is again equalized, such that an effect from the user's perspective is that the virtual audio source 350 is in front of his face.

The audio safety spatialization features described above may be activated upon detection of particular conditions or activities. For example, the headphones and/or coupled computing devices may determine based on sensor input that the user is jogging, cycling, skateboarding, traveling on a path near traffic, traveling on public transportation, occupying a busy space such as a crowded sidewalk, or performing any of a number of other activities for which the user may desire a heightened awareness of his surroundings. Upon detection of such conditions or activities, the headphones may automatically switch to an audio safety spatialization mode.

Figure 4A:
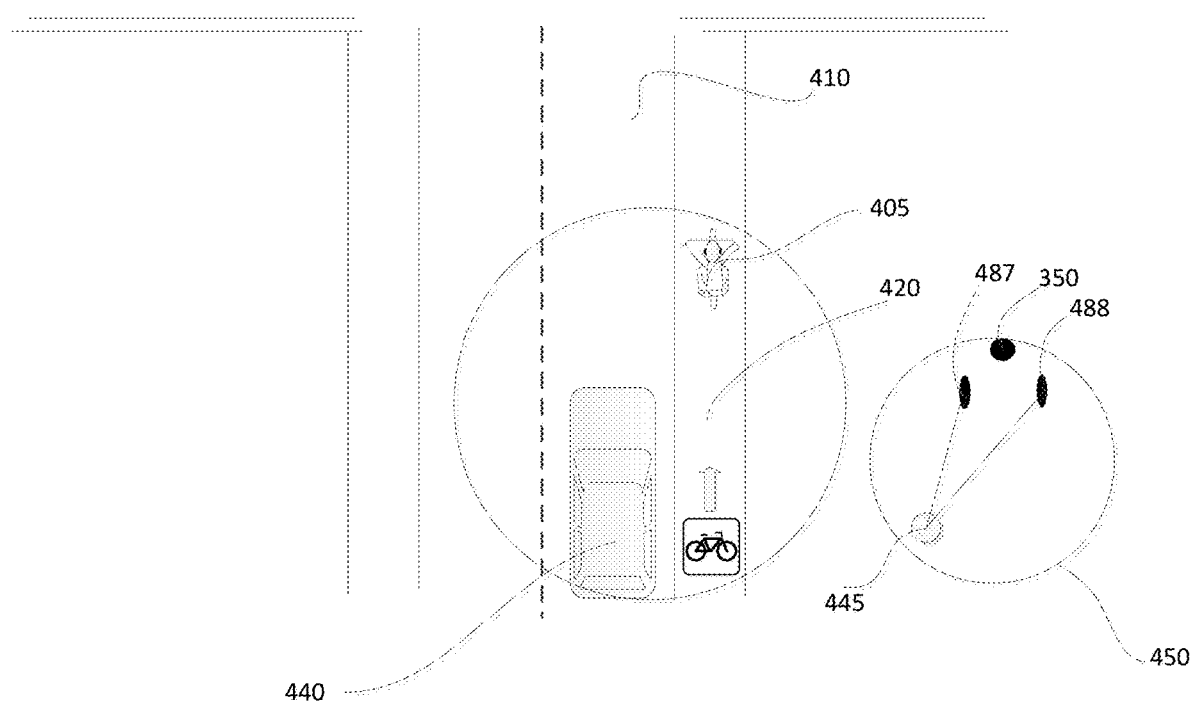
FIGS. 4A-4C illustrate example audio spatialization techniques according to aspects of the disclosure.
Figure 4B:
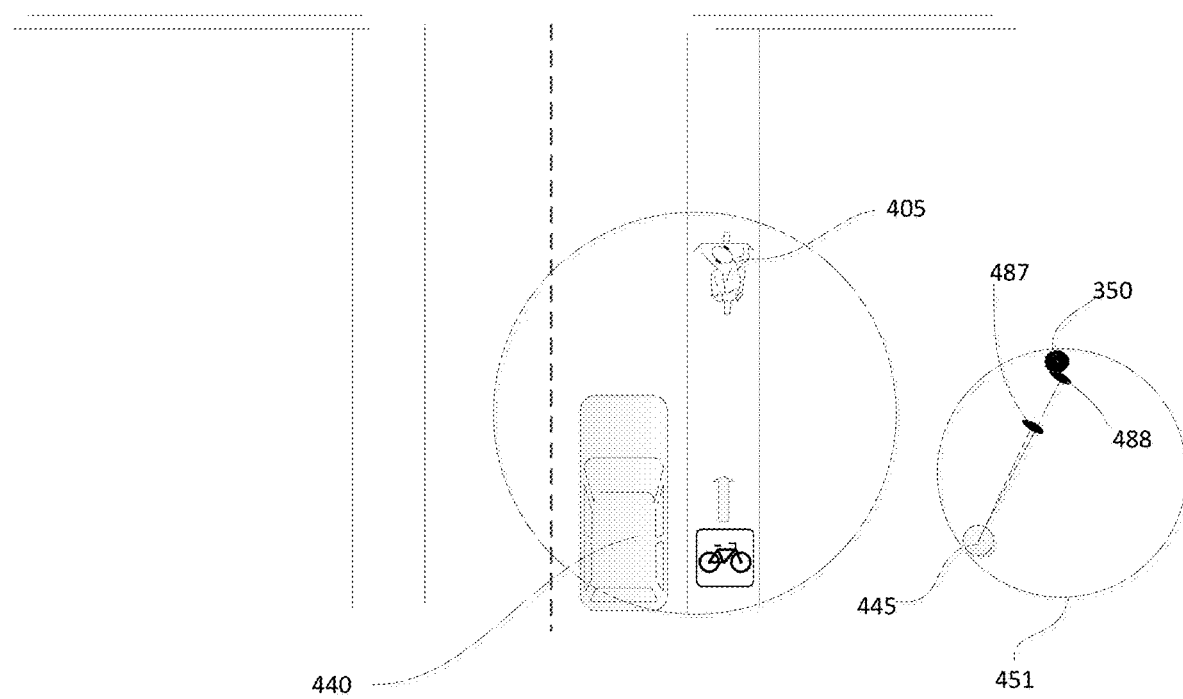
Figure 4C:
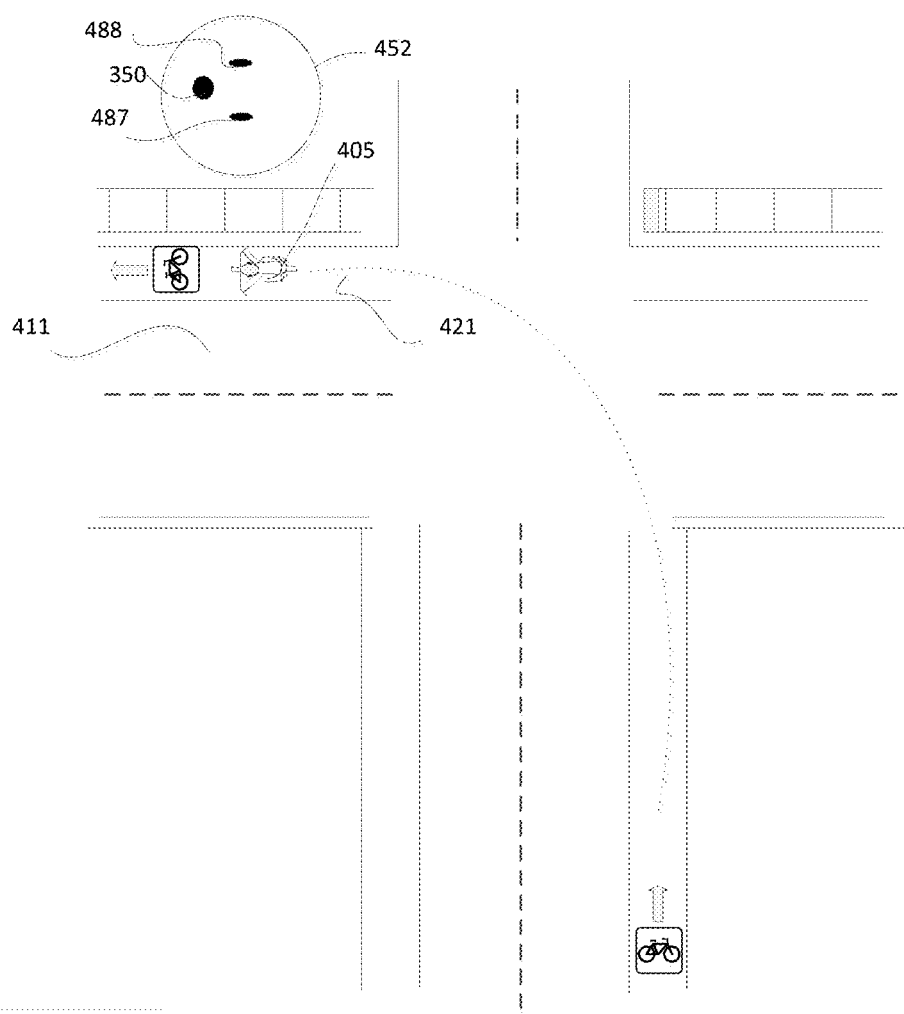

FIGS. 4A-4C illustrate another example of audio safety spatialization. In this example, the feature is activated in response to detection of the user performing a predetermined activity of cycling.

As shown in FIG. 4A, headphones user 405 is cycling in bicycle path 420 alongside a roadway 410. A vehicle 440 is also traveling on the roadway 410, and approaching the user 405 from behind. Detailed view 450 shows a relative position of left ear portion 487 and right ear portion 488 of the user's headphones, in relation to sound source 445 which corresponds to the vehicle 440. The user's head is facing forward, and the left ear portion 487 and right ear portion 488 are generally parallel along a plane that is perpendicular to the user's direction of travel. As the sound source 445 approaches from behind on the user's left side, and is slightly closer to the user's left ear than the right ear, sounds from the vehicle 440 may be heard slightly louder in the user's left ear portion than the user's right ear. The virtual audio source 350, however, is in front of the user, and each of the left ear portion 487 and right ear portion 488 are approximately equidistant from the virtual audio source 350. Accordingly, sound, such as music, played through the left ear portion 487 is a same level as the sound played through the right ear portion 488.

In FIG. 4B, the user 405 turns his head to the left, such as to see the approaching vehicle 440. The virtual audio source 350, however, remains in the same position. Accordingly, as seen in detailed view 451, as a result of the user's head turn, the right ear portion 488 of the headphones is angled closer to the virtual audio source 350 than the left ear portion 487. As such, sound played through the left ear portion 487 is reduced as compared to sound played through the right ear portion 488. This allows the user to more clearly hear the sound source 445 of the vehicle 400, which is closer to the user's left ear than the right ear.

In FIG. 4C, the user 405 has changed directions, and is now traveling along path 421 near roadway 411, which is approximately perpendicular to his previous direction of travel. Accordingly, as shown in detailed view 452, an orientation of the user's headphones has also changed with respect to the previous orientations of FIGS. 4A-B. However, the headphones may determine that the change is orientation is due to a change in the user direction. For example, such determination may be based on the headphones remaining in the updated orientation for at least a predetermined period, a detected change in the user's direction of travel, or other information. Accordingly, the virtual audio source 350 may be automatically adjusted in relation to the updated orientation. As shown in FIG. 4C, the virtual audio source 350 returns to a neutral position with respect to the updated orientation of the headphones, such that the right ear portion 488 and left ear portion 487 are again approximately equidistant from the virtual audio source 350, similar to the relative positions of FIG. 4A. In this orientation, music or other sound played through the left and right ear portions of the headphones is played at approximately equal levels.

As discussed above, the audio safety spatialization feature may be activated upon detection of particular activities performed by the user or conditions surrounding the user. In other examples, however, the audio safety spatialization features may be manually activated by the user, such as by pressing an input button or speaking a verbal command. As such, the user may still benefit from the audio safety spatialization features when performing other tasks, such as working at a desk in an open office environment, hiking through woods, shopping, or performing any other activity that may not necessarily be one of the predetermined activities that will trigger automatic activation of the feature.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 5:
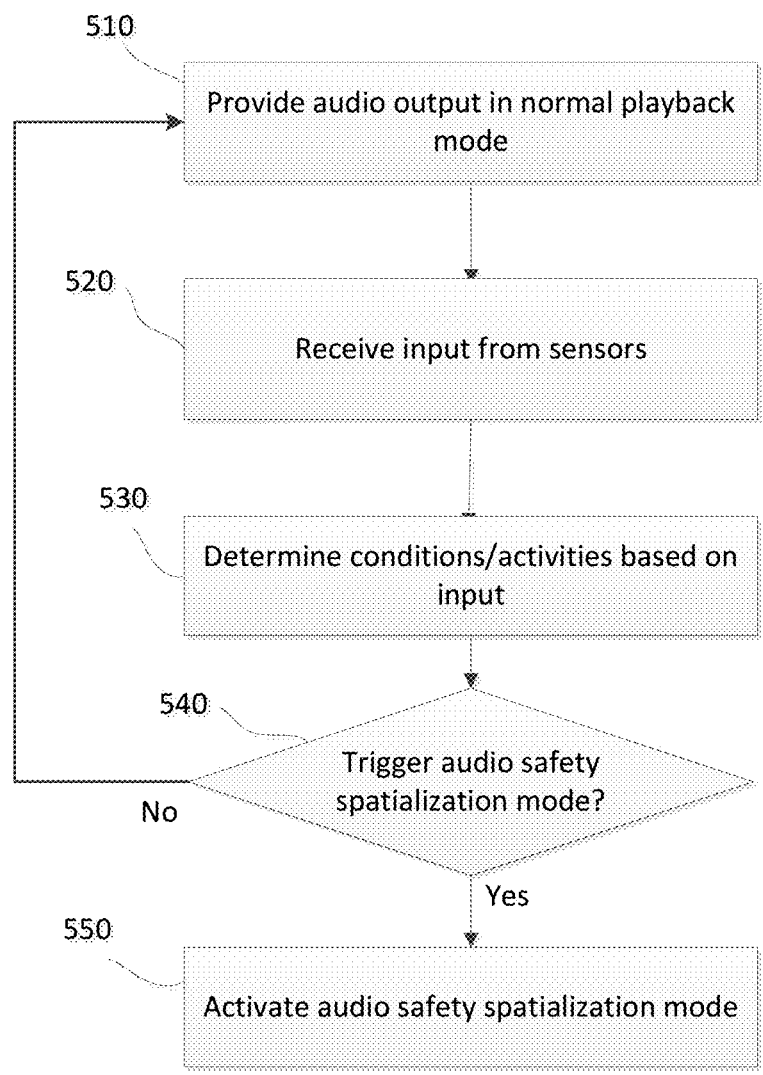
FIG. 5 is a flow diagram illustrating an example method according to aspects of the disclosure.

FIG. 5 illustrates an example method 500 for automatically determining a playback mode of a pair of headphones. The method may be performed by, for example, the headphones. In some examples, the method may also utilize information from one or more computing devices, such as mobile phones, smart watches, etc., coupled to the headphones.

In block 510, the headphones provide audio output in a normal playback mode. In this normal mode, for example, the headphones may provide output at equal levels in both a left ear portion and a right ear portion.

In block 520, input is received from one or more sensors. Examples of such sensors include an accelerometer, a gyroscope, a magnetometer, a pedometer, GPS, microphone, or any of a number of other types of sensors. The input may provide information relating to movements of the user or conditions surrounding the user. By way of example only, the information may indicate whether the user is outdoors, a direction in which the user is moving, a number of people or other devices within a certain proximity of the user, etc. The input may be received continually, or periodically, such as every few milliseconds, tenths of a second, seconds, etc.

In block 530, an activity performed by the user and/or conditions surrounding the user may be determined based on the received sensor input. For example, it may be determined whether the user is cycling, jogging, performing some other type of exercise, commuting, sightseeing, etc.

In block 540, it is determined whether the determined activity/condition triggers an audio safety spatialization mode. For example, a set of activities of conditions that will trigger the audio safety spatialization mode may be predefined, either by a manufacturer or by a user. The activities/conditions may be defined with varying degrees of specificity. For example, a more specific activity may designate an action of the user and an environment, such as cycling on a roadway where more than 5 vehicles pass by per minute. A less specific activity may designate fewer parameters, such as simply jogging. In some examples, threshold parameters may be set to distinguish particular activities from others. For example, traveling at a threshold range of speed may distinguish cycling from driving in a car.

If the determined activity/condition does not trigger audio safety spatialization mode, the method 500 may return to block 510 where playback continues in normal mode. However, if the activity/condition qualifies as one of the predefined activities/conditions, the headphones may automatically switch to operation in audio safety spatialization mode (block 550).

Figure 6:
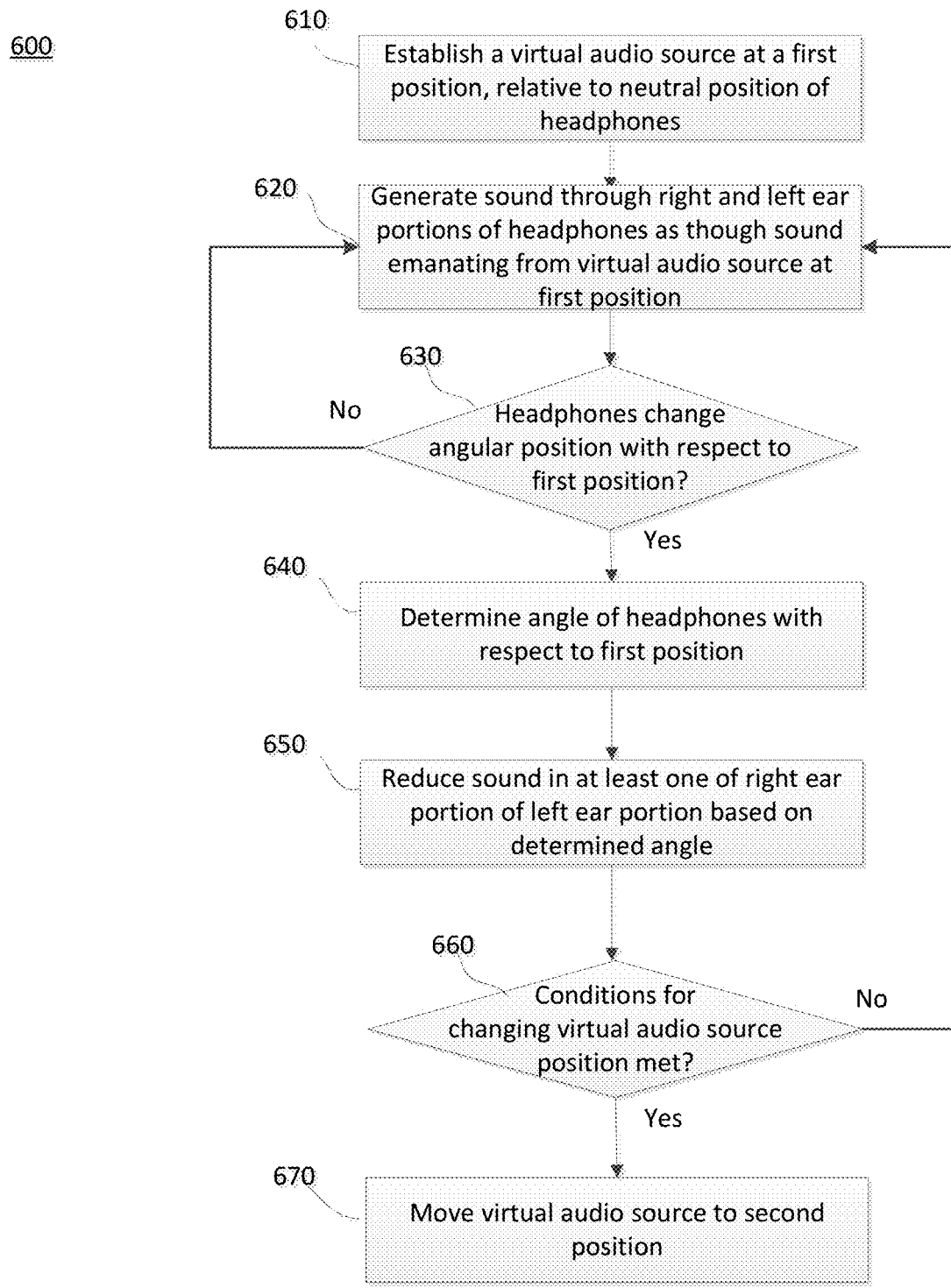
FIG. 6 is a flow diagram illustrating another example method according to aspects of the disclosure.

FIG. 6 illustrates an example method 600 of operation of the headphones in the audio safety spatialization mode.

In block 610, a virtual audio source is established at a first position, relative to a neutral position of the headphones For example, when the user is wearing the headphones, an initial angle $\theta$, corresponding to a current direction the user is facing, is set to zero. The user's direction may be determined based on information from any of one or more sensors in the headphones and/or coupled computing devices. Examples of such sensors include accelerometer, gyroscope, magnetometer, etc. The first position may be in front of the user, though in other examples the first position may be behind the user or in any other relative position.

In block 620, sound is generated through the left ear portion and the right ear portion of the headphones as though the sound is emanating from the virtual source at the first position. Accordingly, for example, the sound may be played at an equal volume in both the left and right ear portions of the headphones.

In block 630, it is determined whether an angular position of the headphones has changed with respect to the first position. For example, it may be determined whether an orientation of the headphones shifted in a way that indicates the user turned his head left or right. If the angular position does not change, the method 600 may return to block 620 and continue to generate sound as indicated. If a change is angular position is detected, however, the method 600 proceeds to block 640.

In block 640, an angle of the headphones with respect to the first position is determined. For example, where the angle $\theta$ was initialized to zero, an updated value for the angle $\theta$ may be determined.

In block 650, playback in the left and/or right ear portions of the headphones is adjusted based on the determined angle. For example, sound may be reduced in volume at least one of the left ear portion or the right ear portion. In other examples, sound may be increased in volume in one of the left or right ear portions. The amount of reduction or increase in volume may vary as a function of the determined angle.

In some examples, a return-to-zero function may be applied to the angle $\theta$, such that the angle of the virtual audio source relative to the user always returns to zero. For example, in block 660 it is determined whether conditions for changing a position of the virtual audio source are met. The conditions may be based on an amount of time the headphones remain at the angle $\theta$, an amount of distance traveled while the headphones are at the angle $\theta$, etc. Such conditions may not be met if, for example, the user briefly turns his head to one side and then returns to the initial neutral position. In such case, the method 600 returns to block 620. However, if the conditions are met, the method 600 proceeds to block 670 where the return-to-zero-function is applied.

In block 670, the virtual audio source is moved to a second position in space, such that the angular position of the virtual audio source relative to the user is consistent with the initial neutral position. For example, the angle $\theta$ may be reinitialized based on the current value determined in block 640. In this regard, the virtual audio source may remain in the same relative position to the user for the majority of the user's use of the headphones.

The foregoing system and methods are advantageous in that they provide for increased safety of users wearing headphones while participating in various activities. By automatically activating the audio safety spatialization features, the user may perform a variety of tasks without having to remember to activate the feature. Moreover, as the feature enables increased awareness of the user's surroundings, the user will be more prepared to react to the environment around them.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for producing sound through one or more wearable audio output devices having a right ear portion and a left ear portion, the method comprising:
    emitting sound through the wearable audio output devices in a first mode;
    detecting one or more conditions surrounding a user wearing the one or more wearable audio output devices;
    determining, based on the detected conditions, an activity being performed by the user;
    determining, with one or more processors, whether the determined activity triggers an audio spatialization mode for the one or more wearable audio output devices, in which audio output is adjusted in relation to angular movement with respect to a virtual audio source, wherein determining whether the determined activity triggers an audio spatialization mode comprises determining whether the activity comprises at least one of:
        moving in a given direction within a threshold range of speed,
        moving within a threshold distance of vehicular traffic, or
        moving on a path traveled by other people; and activating the audio spatialization mode when the determined activity triggers the audio spatialization mode.

2. The method of claim 1, wherein the threshold range of speeds encompasses speeds associated with at least one of walking or cycling.

3. The method of claim 1, wherein the threshold range of speeds is slower than speeds associated with traveling in a motor vehicle.

4. The method of claim 1, further comprising detecting the angular movement of the one or more wearable audio output devices when the audio spatialization mode is activated.

5. The method of claim 1, wherein activating the audio spatialization mode comprises:
  establishing the virtual audio source at a first position, the first position being a first point in space relative to a neutral position of the one or more wearable audio output devices when worn by a user;
  generating sound through the right ear portion and the left ear portion of the one or more wearable audio output devices, such that the sound is produced with an effect of emanating from the virtual source;
  detecting angular movement of the one or more wearable audio output devices with respect to the first position;
  determining an angle of the wearable audio output device with respect to the first position as a result of the detected angular movement;
  adjusting a sound level in at least one of the right ear portion or the left ear portion based on the determined angle; and
  moving the virtual audio source to a second position when one or more conditions are met, the second position being a second point in space different from the first point in space but a same position relative to the neutral position of the one or more wearable audio output devices.

6. The method of claim 5, wherein adjusting the sound level comprises:
  reducing the sound level in the left ear portion when the detected angular movement of the wearable audio output device is to the left; and
  reducing the sound level in the right ear portion when the detected angular movement of the wearable audio output device is to the right.

7. The method of claim 5, wherein adjusting the sound level comprises:
  increasing the sound level in the right ear portion when the detected angular movement of the wearable audio output device is to the left; and
  increasing the sound level in the left ear portion when the detected angular movement of the wearable audio output device is to the right.

8. A system, comprising:
  one or more wearable audio output devices comprising a left-ear audio output and a right-ear audio output;
  one or more sensors;
  a memory storing instructions for generating audio through the left-ear audio output and the right-ear audio output; and
  one or more processors in communication with the memory and the one or more sensors, the one or more processors configured to:
    emit sound through the wearable audio output devices in a first mode;
    detect one or more conditions surrounding a user wearing the one or more wearable audio output devices;
    determine, based on the detected conditions, an activity being performed by the user;
    determine whether the determined activity triggers an audio spatialization mode for the one or more wearable audio output devices, in which audio output is adjusted in relation to angular movement with respect to a virtual audio source, wherein determining whether the determined activity triggers an audio spatialization mode comprises determining whether the activity comprises at least one of:
      moving in a given direction within a threshold range of speed,
      moving within a threshold distance of vehicular traffic, or
      moving on a path traveled by other people; and
    activate the audio spatialization mode when the determined activity triggers the audio spatialization mode.

9. The system of claim 8, wherein the threshold range of speeds encompasses speeds associated with at least one of walking or cycling.

10. The system of claim 8, wherein the threshold range of speeds is slower than speeds associated with traveling in a motor vehicle.

11. The system of claim 8, wherein the one or more processors are further configured to detect the angular movement of the one or more wearable audio output devices when the audio spatialization mode is activated.

12. The system of claim 8, wherein in activating the audio spatialization mode, the one or more processors are further configured to:
  establish the virtual audio source at a first position, the first position being a first point in space relative to a neutral position of the one or more wearable audio output devices when worn by a user;
  generate sound through the right ear portion and the left ear portion of the one or more wearable audio output devices, such that the sound is produced with an effect of emanating from the virtual source;
  detect angular movement of the one or more wearable audio output devices with respect to the first position;
  determine an angle of the wearable audio output device with respect to the first position as a result of the detected angular movement;
  adjust a sound level in at least one of the right ear portion or the left ear portion based on the determined angle; and
  move the virtual audio source to a second position when one or more conditions are met, the second position being a second point in space different from the first point in space but a same position relative to the neutral position of the one or more wearable audio output devices.

13. The system of claim 12, wherein adjusting the sound level comprises:
  reducing the sound level in the left ear portion when the detected angular movement of the wearable audio output device is to the left; and
  reducing the sound level in the right ear portion when the detected angular movement of the wearable audio output device is to the right.

14. The system of claim 12, wherein adjusting the sound level comprises:
  increasing the sound level in the right ear portion when the detected angular movement of the wearable audio output device is to the left; and increasing the sound level in the left ear portion when the detected angular movement of the wearable audio output device is to the right.

\* \* \* \* \*